(12) United States Patent
Newton et al.

(10) Patent No.: US 7,137,074 B1
(45) Date of Patent: Nov. 14, 2006

(54) SYSTEM AND METHOD FOR DISPLAYING ALARM STATUS

(75) Inventors: Glen E. Newton, Eagan, MN (US); Peter E. Newcombe, Glenwood City, WI (US); Michael LeDuc, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 562 days.

(21) Appl. No.: 10/160,715

(22) Filed: May 31, 2002

(51) Int. Cl.
*G06F 17/00* (2006.01)

(52) U.S. Cl. .................. 715/835; 715/837; 715/736; 715/810; 715/763

(58) Field of Classification Search ........ 715/761–765, 715/853, 866, 771, 835–838, 736, 700, 810; 376/259; 340/506
See application file for complete search history.

(56) References Cited

U.S. PATENT DOCUMENTS

| | | | | |
|---|---|---|---|---|
| 5,506,955 A | * | 4/1996 | Chen et al. | 714/26 |
| 5,802,255 A | * | 9/1998 | Hughes et al. | 706/59 |
| 5,872,931 A | * | 2/1999 | Chivaluri | 709/223 |
| 5,944,782 A | * | 8/1999 | Noble et al. | 709/202 |
| 6,018,567 A | * | 1/2000 | Dulman | 379/32.03 |
| 6,112,015 A | * | 8/2000 | Planas et al. | 709/223 |
| 6,122,664 A | * | 9/2000 | Boukobza et al. | 709/224 |
| 6,128,016 A | * | 10/2000 | Coelho et al. | 715/808 |
| 6,137,470 A | * | 10/2000 | Sundstrom et al. | 715/786 |
| 6,208,324 B1 | * | 3/2001 | Sundstrom et al. | 715/846 |
| 6,222,547 B1 | * | 4/2001 | Schwuttke et al. | 345/419 |
| 6,271,845 B1 | * | 8/2001 | Richardson | 715/764 |
| 6,275,855 B1 | * | 8/2001 | Johnson | 709/224 |
| 6,456,306 B1 | * | 9/2002 | Chin et al. | 715/810 |
| 6,496,209 B1 | * | 12/2002 | Horii | 715/853 |
| 6,501,490 B1 | * | 12/2002 | Bell | 715/837 |
| 6,609,038 B1 | * | 8/2003 | Croswell et al. | 700/83 |
| 6,630,944 B1 | * | 10/2003 | Kakuta et al. | 715/758 |
| 6,690,274 B1 | * | 2/2004 | Bristol | 340/506 |
| 6,773,932 B1 | * | 8/2004 | Robinson et al. | 438/14 |
| 6,853,388 B1 | * | 2/2005 | Ueno et al. | 715/736 |
| 6,901,442 B1 | * | 5/2005 | Schwaller et al. | 709/224 |
| 2002/0012011 A1 | * | 1/2002 | Roytman et al. | 345/736 |
| 2003/0135382 A1 | * | 7/2003 | Marejka et al. | 705/1 |

* cited by examiner

*Primary Examiner*—Tadesse Hailu
(74) *Attorney, Agent, or Firm*—Beth L. McMahon; Charles A. Johnson; Mark T. Starr

(57) ABSTRACT

The invention provides an improved automated system and method for monitoring the states of other systems. In one embodiment, the inventive system and method may be employed by an operations console that is monitoring the state of one or more data processing systems. According to the invention, a set of states is defined to describe events or conditions occurring within the monitored systems. A set, or "family", of files is defined, wherein the family includes an associated file for each of the defined states. When one or more of the monitored systems are determined to be in a predetermined state, data signals stored within the associated file may be used to generate some type of signal that may be readily perceived by the operator to determined the state. For example, the data signals may be used to generate a visual or audio representation of the state.

47 Claims, 14 Drawing Sheets

| Alarm Detail | | |
|---|---|---|
| Window Control Application Help | | |
| Date: | 04/22/2002 | Sender Date: |
| Time: | 12:31:21 PM | Sender Time: |
| Alarm Id: | _NTConnectionDown | |
| Alarm Qualifier: | | |
| Severity: | 5-major | |
| Node: | W2K-1 | |
| Node Class: | Windows (windows_host) | |
| Application: | SPO | |
| Application Qualifier: | | |
| Acknowledged: | no | |
| External Action List: | | |

Alarm Text:

Connection to Windows system unavailable.

Alarm Help Text:                                                              Alarm Help File: _NTConnectionDown Single Point Operations Console is not communicating with
the SPO Windows agent on the Microsoft Windows system.

This may occur for one of the following reasons:
 - The SPO Windows agent is not running on the Windows
 system.
 - The Windows system is not running.
 - The communications link to the Windows system is
 inoperable.

*Figure 3C*

| Alarm Category | Alarm Icon | Display Severity Counts? | Alarm Icon Severity | Raise Window Severity | Sound/Video Family | Sound Threshold | Sound Repetition | Sound Trigger | Sound Priority |
|---|---|---|---|---|---|---|---|---|---|
| Configuration | Lights95 | yes | Show Severities | 3-warning | low-voice | 4-minor | 2x, wait 60 | new alarm | A |
| TestFloor | ConfigClassic90 | no | Show Severities | none | stream1 | none | none | none | – |
| ProdEast | ConfigClassic90 | yes | Show Severities | 5-major | panicbuzzer | 6-critical | endless | level increase | B |
| ProdWest | ConfigClassic90 | yes | Show Severities | 5-major | high-voice | 5-major | endless, wait 15 | level change | C |
| ProdSouth | ConfigClassic90 | yes | Show Severities | 5-major | none | none | none | none | – |
| Other | Sign50 | yes | 1-indeterminate | none | beeper | 1-indeterminate | 1x | new alarm | F |

*Figure 4A*

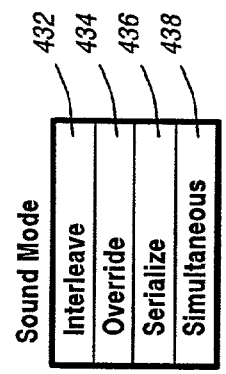

Sound Mode
- Interleave
- Override
- Serialize
- Simultaneous

*Figure 4B*

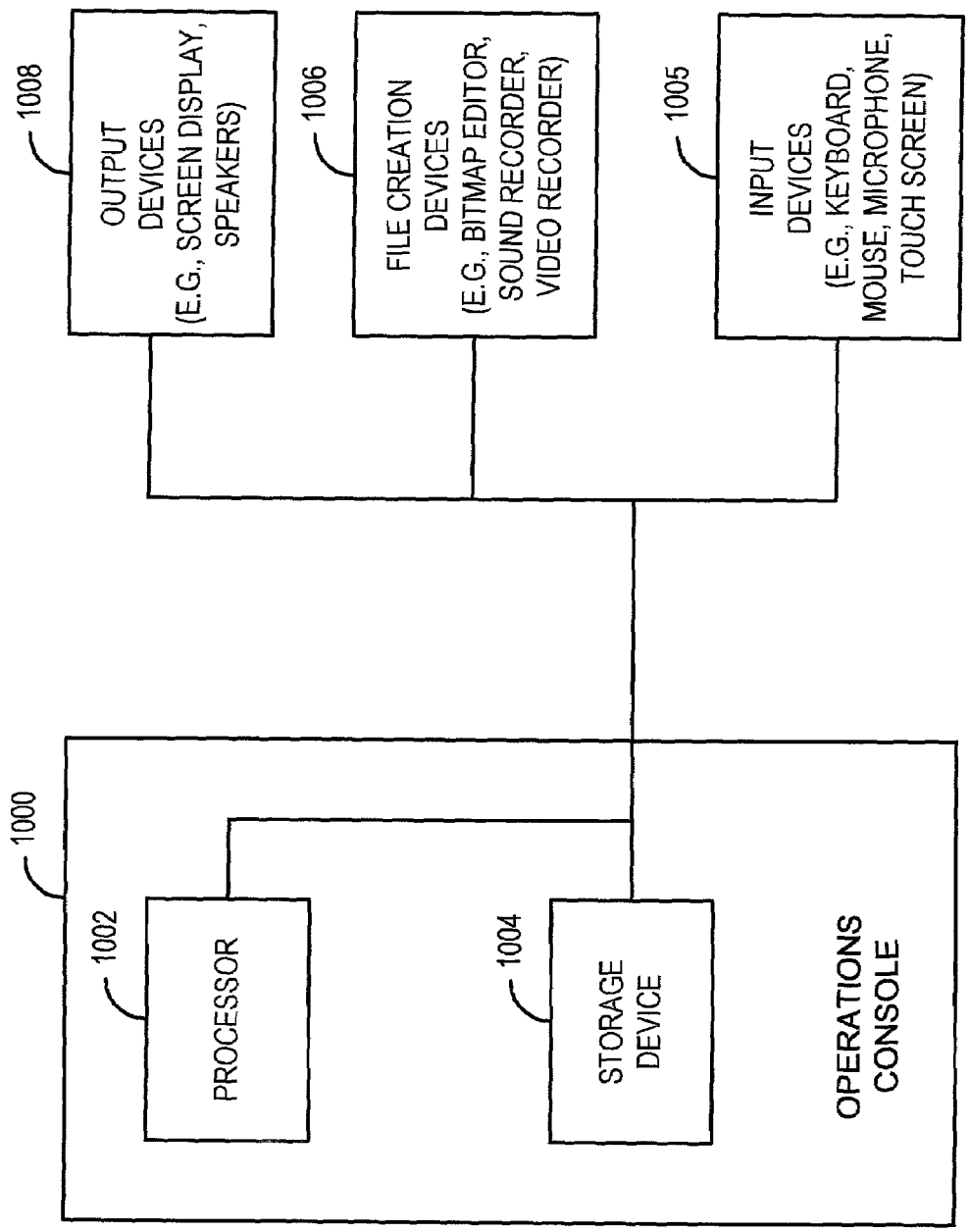

SYSTEM AND METHOD FOR DISPLAYING ALARM STATUS

FIELD OF THE INVENTION

This invention relates generally to a system and method for communicating status related to a state of a data processing system; and more particularly, to a system and method that employs user selected audio and visual data to communicate a state of the data processing system.

BACKGROUND OF THE INVENTION

Large-scale data processing systems such as 2200 Series data processing systems commercially available from Unisys Corporation have historically required human intervention to oversee day-to-day operations. Human interaction is provided through the use of an operator interface, which may include an operations server and console. The operations server is coupled to one or more data processing systems to provide a single point of control for monitoring those systems. Typical operations consoles include a data entry device such as a keyboard and/or a mouse. A display monitor is also provided to display status information pertaining to the monitored data processing systems.

As discussed above, a single operations console may be monitoring one or more data processing systems. The operations console supports tasks such as booting, configuring, scheduling jobs, managing files, and responding to exceptions, for the various systems that are being monitored. One of the major tasks of an operations console involves providing the operator with useful system status. If a single operations console is monitoring many data processing systems, this status must be provided in an organized manner that allows the operator to readily recognize the existence and location of a problem.

Many prior art systems provide status information on a summary display screen. This type of screen summarizes the various problems that may exist in the systems that are being monitored. More detailed information can be obtained by viewing additional display screens. One problem with these prior art systems, however, is that the summary information is not ascertainable when the operator is located any distance from the console. When an operations console is monitoring one or more systems that are located within a large room, the operator may often be attending to matters across the room. In this case, the operator must periodically discontinue a task to consult the operations console to determine whether any addition status information has recently been provided by any of the monitored systems.

Some prior art systems attempt to make the operation console more user-friendly by employing a symbol or message that is sized to be visible by an operator located some distance from the console. This symbol or message alerts the operator to the existence of new information. When this symbol or message is displayed, the operator knows to consult the operations console for more details. Because the operations console generates the same symbol or message for all newly received system status, the operator may discontinue a task only to find that the received status is purely informational and did not necessitate any response. The operator is therefore unnecessarily interrupted whenever the operation console receives any new status, regardless of the importance of the new data.

What is needed, therefore, is an improved system and method for reporting status in an environment wherein one or more systems are managed by an operations console.

SUMMARY OF THE INVENTION

The invention provides an improved automated apparatus and method for monitoring the states of other systems. In one embodiment, the inventive system and method may be employed by an operations console that is monitoring the state of one or more data processing systems. According to the invention, a set of states is defined to describe events or conditions occurring within the monitored systems. In the context of an operations console, the states correspond to the severity of alarms that are issued by the monitored systems, where an alarm is an informational, or another type, of message.

The current invention provides a way for a user such as a computer operator to easily recognize a state that exists within the monitored systems. A set, or "family", of files is defined, wherein the family may include a respective file for each of the defined states. When one or more of the monitored systems are determined to be in a predetermined state, the associated file may be used to generate some type of signal that may be readily perceived by the operator. For example, in one embodiment, each file in the family of files includes data signals that may be used to generate a visual representation, or icon, that can be displayed on a display screen. The icon may be sized to allow an operator that is located some distance from the console to ascertain the system state from the icon. In another embodiment, each file in the family of files is an audio file that may be played to transmit an audio indication of the system state.

According to one aspect of the invention, an icon is displayed that represents the alarm having the highest severity level of all alarms raised by the monitored data processing systems. The presence of any additional (less severe) alarms can be ascertained using additional information that is displayed with the icon, or that is provided in another display window. In another embodiment, multiple types of alarms are defined. An icon is displayed for each type of alarm defined within the system. In yet another embodiment, a display is provided that includes a respective icon for each of the data processing systems contained within a monitored configuration.

Multiple families of files, including multiple icon families and/or audio families, may be defined for use within the current inventive system. The user may select which of the families are to be used as the default families. For example, one family of icons may be selected for use in displaying the state of the monitored data processing systems. Similarly, a family of audio files may be selected for use in generating sounds indicative system status.

According to one aspect of the invention, the user is allowed to define one or more of the families of files discussed above. For example, a user may employ a bitmap editor, which is preferably a bitmap editor capable of creating a multi-color pixel map, to create a family of icons. Any combination of colors, shadings, patterns, and any other visual attributes may be selected to distinguish one icon from other icons within the same icon family. The visual characteristics that are selected may have a secondary meaning that reinforce the connection between an icon and an alarm state. As a simple example, an icon that is associated with a critical alarm state may include a large red exclamation point. In a similar manner, a user may employ a recording program to create one or more customized families of audio files.

In yet another embodiment, the invention provides a system to monitor a state of one or more other systems, wherein a set of states is defined to describe the one or more other systems. The system includes a file creation device to allow a user to create one or more families of files. Each of the files in a family is associated with a state included within the set of states. The system further includes an input device to allow a user to select one of the families as a default family. An operations console is coupled to the file creation device and the input device to select a file from the default family. The selected file is associated with a state of the one or more other systems. Data signals included within the selected file are provided to an output device, which generates one or more signals that may be perceived by a user of the system to comprehend the state of the one or more systems.

According to another embodiment of the invention, a system is provided to monitor one or more other systems, wherein a set of states is defined to describe the systems being monitored. The system includes a storage device to store a family of files, wherein each of the files in the family is respectively associated with one of the states in the predetermined set of states. A processor is coupled to the storage device to determine the state of the one or more other systems, and to select a file from the family of files that is respectively associated with the determined state. An output device such as a display screen, one or more audio devices such as speakers, or another output device, is coupled to the storage device to translate the data signals included within the selected file into a format that may be sensed by a user of the inventive system. According to another aspect of the invention, the storage device may store multiple families of files. An input device is provided to allow a user to select one of the families of files as a default family.

According to yet another embodiment of the invention, a method is provided for use by an operations console. The operations console is capable of monitoring, and obtaining an existing alarm state for, at least one data processing system, wherein the existing alarm state is selected from a set of predefined alarm states. The method includes the steps of defining an icon family that includes, for each of the predefined alarm states, an icon associated with the alarm state. The method further includes displaying an icon from the icon family that indicates the existing alarm state.

Other scopes and aspects of the invention will become apparent from the following description and the accompanying drawings.

BRIEF DESCRIPTION OF THE DRAWINGS

FIG. 3C is yet another window for viewing more detailed alarm information.

FIG. 4A is a diagram of a window for configuring various attributes associated with displaying alarm icons.

FIG. 4B is a diagram illustrating a window that allows selection of a sound mode.

FIG. 10 is a system block diagram of one embodiment of an operations console as may be used to implement the current invention.

DETAILED DESCRIPTION OF THE DRAWINGS

Figure 1:
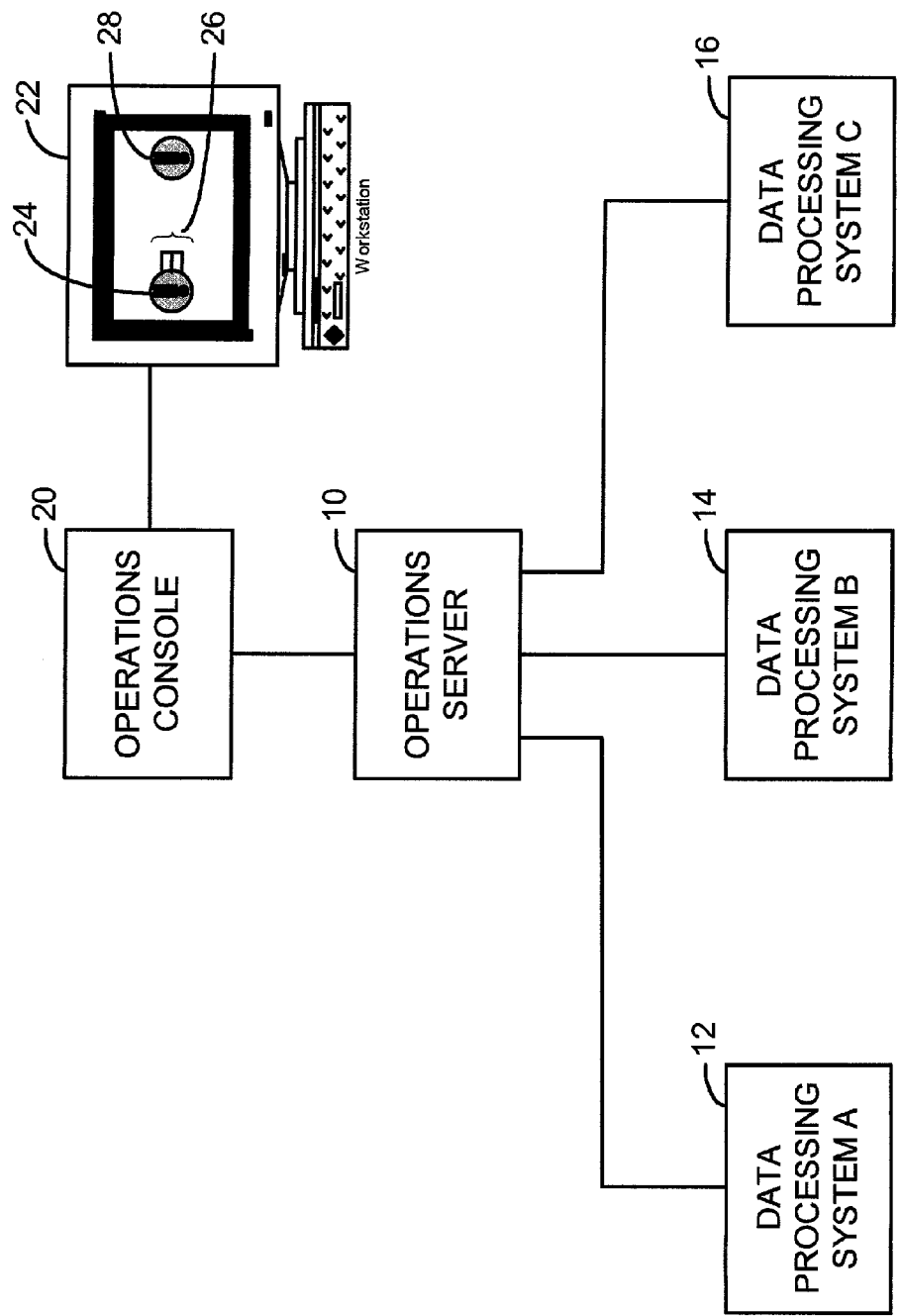
FIG. 1 is a block diagram of an exemplary system that includes an operations server that may utilize the current invention.

FIG. 1 is a block diagram of an exemplary system that includes an operations server 10 that may employ the current invention. Operations server 10 is a system that allows an operator to manage and control a "configuration" of various heterogeneous data processing systems from a single location. Operations server 10 can be implemented on virtually any type of data processing system or workstation that has an operating system capable of servicing multiple users.

In the current example, operations server is shown coupled to, and in communication with, data processing system A 12, data processing system B 14, and data processing system C 16. Thus, systems A through C are in the configuration managed by operations server 10. Communication between operations server 10 and these systems may be performed using TCP/IP LAN-based connections, or any other type of remote or local communication networks and/or I/O channels known in the art.

Operations server 10 may further be coupled to additional systems that are not included in the configuration managed by that operations server. For example, operations server 10 may be coupled to a data processing system D that is actually managed by a second operations server (not shown in FIG. 1). The connection to operations server 10 may be provided for redundancy purposes, and may be employed in the event an operations server that is managing system D fails. This is discussed further below.

Data processing systems A through C may be located at a same site as operations server 10, or at one or more remote locations. These systems may include any combination of data processing platform types selected from the group include large-scale data processing systems, UNIX platforms, Microsoft Windows servers, or any other type of data processing system. Large-scale data processing systems may include, for example, 2200-series systems commercially available from Unisys.

As noted above, operations server 10 is a system that allows one operator to monitor and control the multiple heterogeneous computer systems to which it is coupled. Operations server 10 is connected through a LAN or through co-residency on the same hardware device with operations console 20. Operations console, which may execute on any personal computer or workstation, is a client application that provides a visual indication of the status of the various systems being controlled by operations server 10. The graphical display may be provided on any type of a display monitor 22.

One example of an operations console is Single Point Operations (SPO) Console software that is commercially available from Unisys Corporation. A technical overview of some of the various aspects of the SPO operations console is provided in commonly assigned U.S. Pat. Nos. 5,794,239 and 5,764,974.

In one embodiment, operations console provides an alarm summary display. This display provides a summary overview of status associated with the various systems being monitored by operations server 10. This summary display allows an operator to very quickly ascertain the status of the systems within the monitored configuration. In FIG. 1, one embodiment of an alarm summary display is shown being displayed by display device 22.

The alarm summary display screen may include a visual representation, or icon, such as that shown within screen area 24 of display device 22. This icon indicates that some type of an alarm has been raised within the system. An alarm is any type of message generated by one of the data processing systems A–C to operations server 10 for communication purposes. The alarm may be informational only, or may indicate some problem such as a system failure has occurred which requires operator intervention. Generally, the icon within screen area 24 indicates the presence of "unseen" alarms. An alarm is considered "unseen" until an operator acknowledges its presence. Thereafter, an indication of the alarm is removed from the summary display screen.

In some systems, display device 22 may display more than one icon, such as the additional icon depicted within area 28. In these systems, each displayed icon may be associated with, and provide summary information for, a particular type of alarm. For example, screen area 24 may provide a summary indication related to alarms issued by all systems within the configuration that is managed by operations server 10. In contrast, screen area 28 may provide a summary indication of all "other" alarm types, including those alarms that have been issued by systems that are coupled to, but that are not in the configuration managed by, operations server 10. Still other types of alarms may be defined within the context of the current invention.

Prior art operation consoles may employ icons such as those shown in FIG. 1 to indicate the presence of unseen alarms. These systems do not, however, give the user the choice of using predefined or user-defined icons to indicate the severity of the unseen alarms. For example, in some prior art systems, one icon is selected to represent the presence of any unseen alarm, with a second icon indicating the absence of unseen alarms.

Additional information associated with the type and severity of the alarm may be ascertained from lines of text that are displayed next to the associated icon. These lines of text, also referred to as "severity counts", provide a summary of the number, and severity, of the unseen alarms. For example, severity counts may indicate that three unseen critical alarms and two unseen major alarms have been raised within the configuration. Severity counts 26 are shown illustrated in FIG. 1 in association with the icon displayed in screen area 24. For an even more detailed description of the cause of an alarm, an additional status window may be opened, as may be accomplished by "clicking" on the icon or using another screen selection mechanism.

As can be appreciated from the foregoing discussion, each of the one or more icons displayed within a summary display screen may be configured by the operator to have only two states: "no alarm" or "alarm". For example, in FIG. 1, the icon display in screen area 24 may indicate the presence of at least one unseen alarm within the configuration monitored by operations server 10. In contrast, the symbol depicted within screen area 28 may indicate that no "other" alarm exists. As noted above, any additional information is acquired using the severity counts 26, or by opening an additional window displaying more detailed alarm data.

The capabilities provided by prior art operations consoles are suitable if an operator is in close proximity to a display device. However, often the operator is located in a large room that houses a large amount of data processing equipment. The operator may be performing a task at one end of the room when an icon indicates the presence of an unseen alarm at the other end of the room. The operator must stop a current task and walk to display device 22 to ascertain the type and severity of the alarm, since this information is not readily ascertainable from a distance. The current invention provides an improved system and method for using icons in a manner that provides additional system information. According to the current invention, a unique icon may be used for each alarm severity level within the system. This icon may be sized such that an operator located across a room from display device 22 may be able to ascertain the nature of alarms without traversing the room. This is discussed further below in reference to FIGS. 2A through 2E.

Figure 2A:
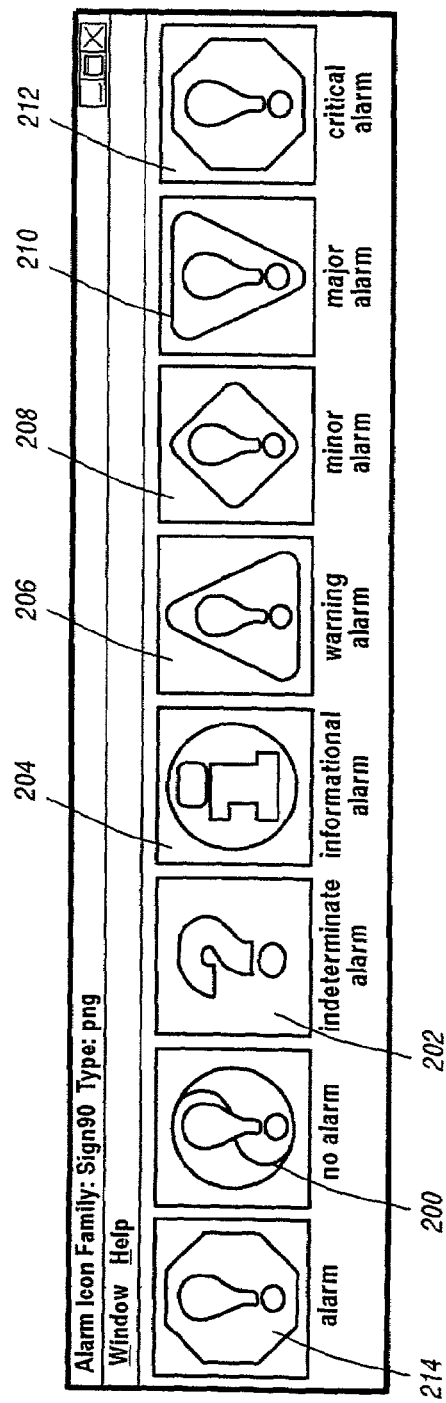
FIG. 2A illustrates a family of icons according to the current invention.

FIG. 2A illustrates a family of icons according to the current invention. Each of the icons within the family indicates a respective alarm severity. For example, icon 200 indicates that no alarm is currently "unseen". Additional icon 202 indicates that an indeterminate alarm has been raised. This icon may be displayed when faulty partition information is used to identify the source of the alarm. Another type of icon 204 indicates that an informational alarm has been received. An alarm of this nature is generally unrelated to a failure, and is instead issued to provide a non-fault notification. Icon 206 provides a warning of an impending problem. Icon 208, which is associated with a minor alarm, indicates that a relatively low-priority problem has occurred. Icons 210 and 212 are the most severe, indicating that major and critical problems have occurred, respectively. The alarms increase in severity as one moves left to right from the "no alarm" icon 200 to "the critical alarm" icon 212.

Also shown in FIG. 2A is the "alarm" icon 214 which may be selected to have the same, or a similar symbol, as critical alarm 212. When the use of alarm severity icons 202 through 210 are disabled in a manner to be discussed below, the alarm icon 214 is displayed to indicate the presence, but not the severity, of an alarm. This is similar to the manner in which icons were used to communicate status in some prior art operations consoles.

In one embodiment of the invention, the icon that is displayed by display device 22 corresponds to the most severe unseen alarm. This can best be explained by example. Returning to FIG. 1, if a major alarm is the most severe unseen alarm existing within the configuration being monitored by operations server 10, icon 210 is displayed within screen area 24 of display device 22. Similarly, if the most severe unseen "other" alarm is an informational alarm, icon 204 is display within screen area 28 of display device 22. These alarms can be sized so that the alarm severity can be ascertained from a distance, such as at a location across the room from the display device. An operator may therefore be able to continue a task without interruption if it is determined that the most severe alarm does not require immediate attention.

As shown in FIG. 2A, the icons within an icon family may be designed to include different geometric shapes, patterns, colors, and symbols that may have some secondary meaning that helps communicate an alarm severity level. For example, the icons of FIG. 2A utilize a three-tiered organization that promotes recognition of alarm status. As a first tier, a background symbol is provided that correlates with widely recognizable traffic signs. For instance, an octagonal "stop sign" shape is included within icon 212 to indicate that an immediate response is required to the associated alarm. Similarly, icon 210 utilizes the upright triangular "yield sign" to indicate a slightly less urgent situation has occurred. Various other symbols correlating to familiar warning and informational signs are included within the other icons shown in FIG. 2A.

As a second tier of communication, color may be used to indicate alarm severity levels. For example, the color red may be selected in icon 212 to reinforce the notion of a "stop sign", and to further indicate that a "hot" problem exists. Yellow may be used by icon 210 to reinforce the notion of the yield function. Colors may range from "hot" to "cool" as one moves from icons representing critical alarms to those representing no alarms.

Foreground emblems are employed in the exemplary icons of FIG. 2A to provide a third tier of information. For instance, punctuation marks such as an exclamation point may be used to represent alarms requiring some degree of response. A web-standard lower case "i" is employed for an alarm status providing information, and a question mark is utilized for any indeterminate status. A yin-yang symbol, which is universally recognized as indicating harmony, may be used to indicate the absence of alarms. In one embodiment, numbers may be used to indicate alarm severity levels.

The foregoing example illustrates how three independently recognizable and mutually supportive iconographic systems can be used in parallel to create a family of icons that promotes quick recognition and response while removing contradiction within the language-to-graphic metaphor. Other mechanisms may also be employed to further enhance the distinction between the various icons. In one embodiment, different patterns may also be employed within the background area, or to shade a symbol included within the icon. For example, hatched, striped, speckled, or any other patterns may be used to further distinguish one icon from another. Still other types of mechanisms are possible within the scope of the current invention.

Figure 2B:
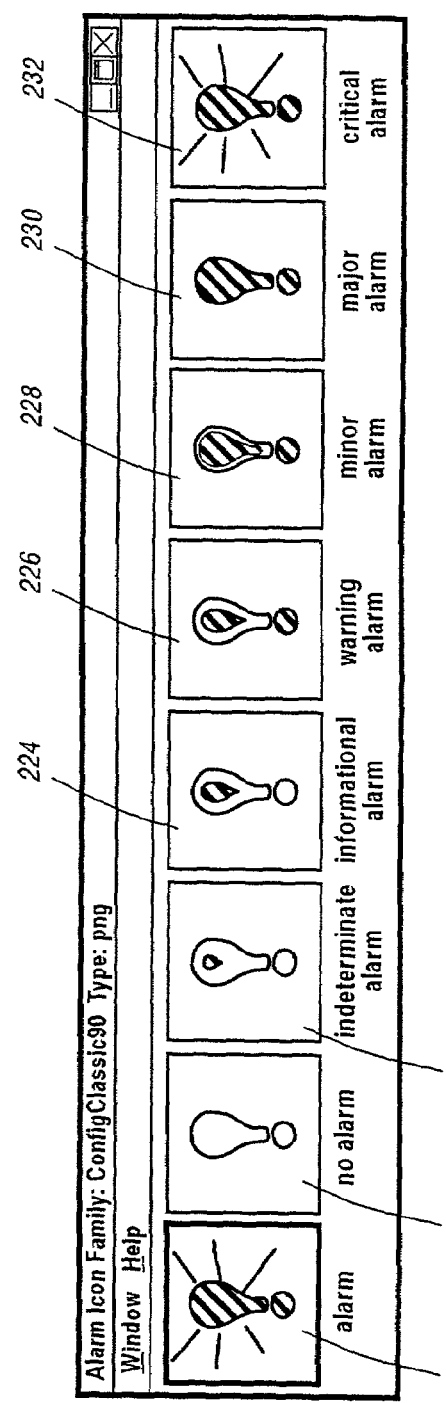
FIG. 2B illustrates another embodiment of a family of icons according to the current invention.

FIG. 2B illustrates another embodiment of a family of icons according to the current invention. The outlined exclamation mark used within the icon includes an increasingly larger shaded area as the severity of the alarm goes from no alarm, as indicated by icon 220, to a critical alarm, as communicated by icon 232. In a manner similar to that discussed above in reference to FIG. 2A, when a user selection is made to disable the use of icons 222 through 232, the presence of any unseen alarm is indicated by icon 234, and the absence of an unseen alarm is communicated by displaying icon 220. In one embodiment, icon 234 may be the same as, or similar to, icon 232 used for a critical alarm.

Figure 2C:
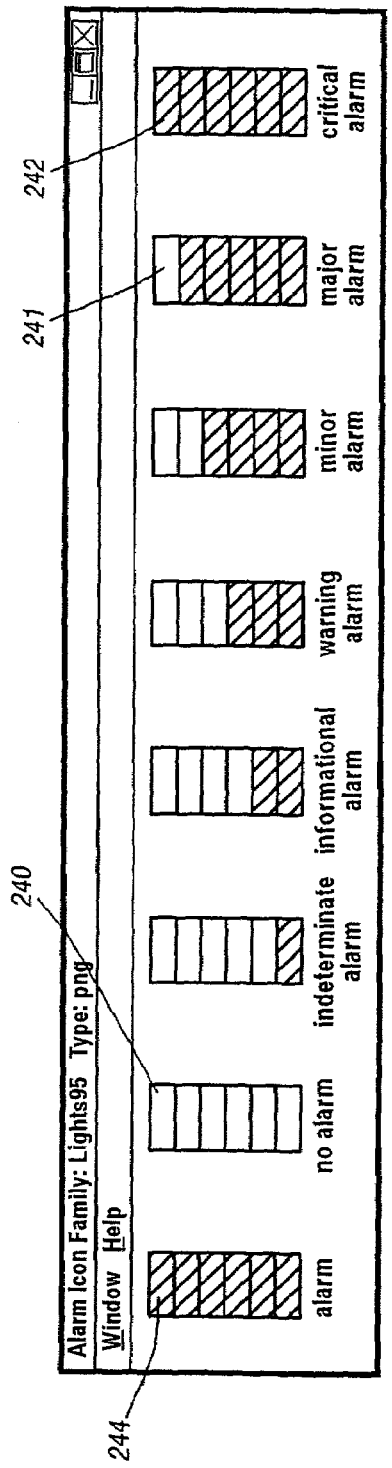
FIG. 2C illustrates yet another family of icons that may be used with the current invention.

FIG. 2C illustrates yet another family of icons that may be used with the current invention. This family uses vertical bars that are increasingly shaded as the severity of the alarm increases. Icon 240, which is associated with the absence of alarms, does not contain a shaded area, whereas icon 242, which indicates the presence of an unseen critical alarm, is completely shaded. Icon 244, which is used when the displaying of alarm severity is disabled, may be the same as icon 242, if desired. However, in the alternative, a different icon may be selected for this purpose. This family of icons uses representations that make a visual and intellectual connection with an operator who is familiar with the use of stacks of color bars to represent loudness of an audio component.

Figure 2D:
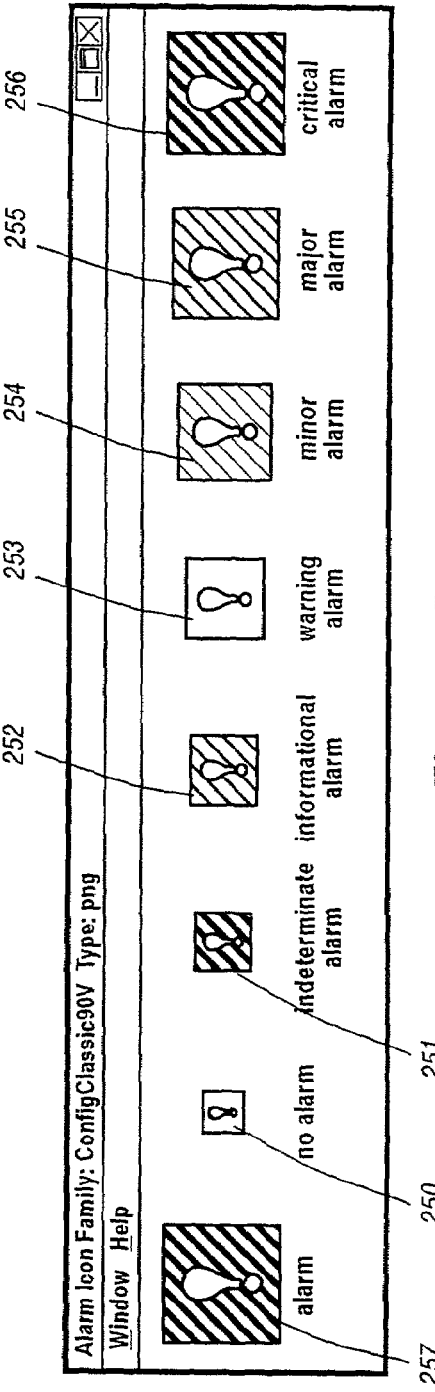
FIG. 2D is still another example of a family of icons that may be used according to the current invention.

FIG. 2D is yet another example of a family of icons that may be used according to the current invention. In this case, the size of the icons increases as one moves from having no unseen alarms, to having a critical alarm. Color, shapes, shading, and other attributes may also be used to further emphasize the increasing severity of an alarm state. As noted above, the size of the alarm is user selectable, and may encompass the entire screen, if desired.

Figure 2E:
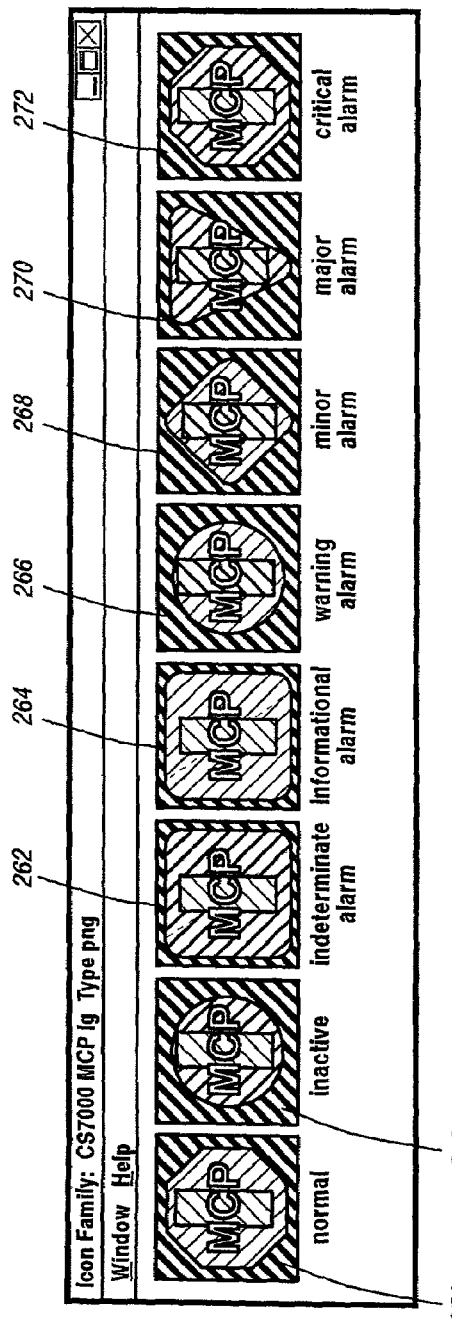
FIG. 2E is another embodiment of a family of icons that may be used to indicate a particular type of system partition.

FIG. 2E is still another embodiment of a family of icons that may be used to indicate a particular type of system partition. In FIG. 2E, for example, the letters "MCP" are displayed in the foreground of the icons to designate a MCP partition that may be included within a CS7000 CMP-based server commercially available from Unisys Corporation. This type of icon is particularly useful when included within a "cluster" diagram that is used to represent a monitored configuration, as is discussed further below.

The icon family of FIG. 2E further incorporates the "stop", "yield", and "warning" road sign concepts discussed above in reference to FIG. 2A. Colors may be selected to reinforce this road sign concept, and to further differential between critical and less severe alarms.

Both similarities and differences may be noted when comparing any of the icon families of FIGS. 2A–2D with the icon family of FIG. 2E. For example, each of the icon families of FIGS. 2D and 2E includes a respective icon for an indeterminate, informational, warning, minor, major, and critical alarm. However, icons 260 and 274 of FIG. 2E have different meanings as compared to, for example, icons 250 and 257, respectively, of FIG. 2D. Icon 260 represents a system, or "host", that is not being monitored, even though it is in the configuration. This icon, which is useful within the context of a cluster diagram, has no counterpart within the other icons families shown in FIGS. 2A through 2D. Icon 274 indicates that no alarm has been received for the system, and therefore corresponds to the "no alarm" icon 250 in FIG. 2D. Finally, it may be noted that the icon family of FIG. 2E does not include an "alarm" icon such as icon 257 of FIG. 2D, which is used when the show alarm severity feature is disabled. This is because an icon family of the type shown in FIG. 2E may be used in cluster diagrams, which is an environment that does not support the disabling of alarm severity levels. Cluster diagrams are discussed in detail below with respect to FIG. 5.

Figure 2F:
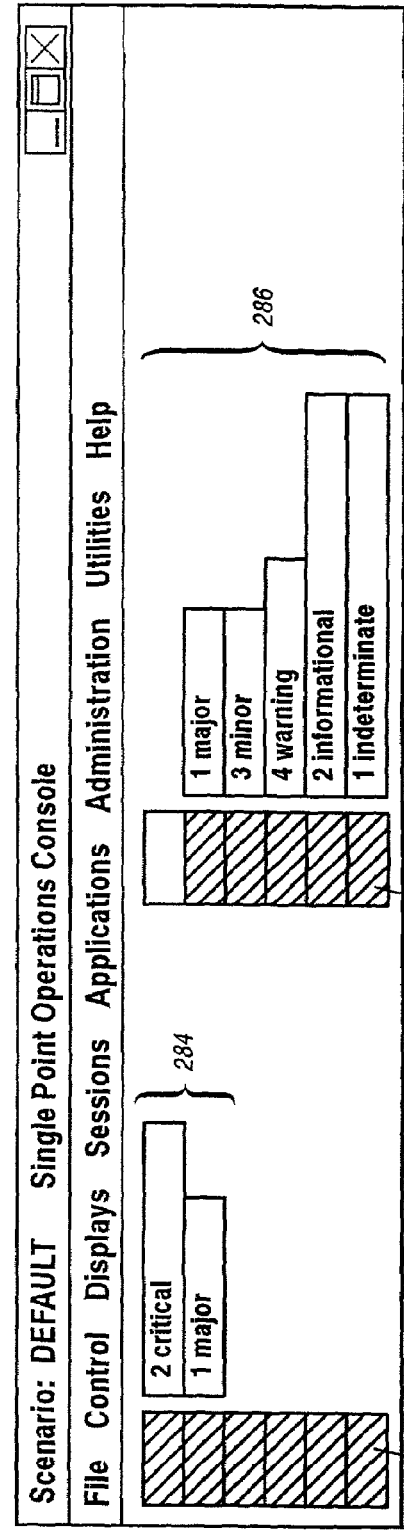
FIG. 2F is an exemplary alarm summary display screen of the type shown in FIG. 1 that uses a selected icon family to summarize alarm status according to the current invention.

FIG. 2F is an exemplary alarm summary display screen of the type shown in FIG. 1 that uses a selected icon family to summarize alarm status according to the current invention. The icon family used in the current example corresponds to that shown in FIG. 2C, although any other family could be selected instead. In the exemplary display screen, icon 280 indicates the unseen configuration alarms, and icon 282 represents the "other" alarms. Icon 280 is associated with severity counts 284, which indicates the types and numbers of unseen alarms within the configuration. Severity counts 284 indicate that two critical unseen configuration alarms exist. Thus, the critical alarm icon 242 of FIG. 2C is depicted for icon 280. Similarly, icon 282 is associated with severity counts 286, which indicate the type and number of the "other" alarms in the system. Since the most severe "other" alarm is a major alarm, the major alarm icon 241 of FIG. 2C is depicted for icon 282.

Any other user-defined icon families may be employed to generate an alarm summary display of the type shown in FIG. 2F. This alarm summary display allows an operator to quickly determine the severity of the alarms that have been raised but not yet seen by the operator within the current configuration and/or other configurations. The alarm severity counts provide further summary information. Additional information concerning the alarms is gained by selecting an alarm status display screen. This can be accomplished by "clicking" on an icon within the summary display screen, or by using menu selection capabilities.

Finally, it may be noted that in FIGS. 2A through 2F, a unique icon is defined for each of the alarm states existing within the system. This need not be the case, however. In an alternative embodiment of the invention, multiple alarm states could be represented by the same icon. For example, icon 212 could be used to represent both a major and a critical alarm state. Alternatively, fewer alarm states could be defined. Either embodiment could be adopted to make icon recognition less complicated for the operator, with any additional information being obtained from other display windows. As discussed above, numeric designators could be included within the icon to make severity levels less difficult to interpret.

Figures 3A, 3B:
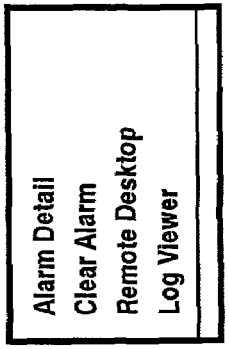
FIG. 3A is one embodiment of an alarm status display screen used to obtain more information regarding an unseen alarm.
FIG. 3B is a window for viewing more detailed alarm information.

FIG. 3A is one embodiment of an alarm status display screen used to obtain more information regarding an unseen alarm. Each row within the screen display of FIG. 3 corresponds to a respective alarm instance. Column 300 indicates the time a respective alarm instance was received. Column 302 indicates whether anyone has acknowledged, or responded, to the alarm in any way. Column 304 provides an indication as to whether the operator has seen the alarm such that it is no longer considered "unseen". The node identifier listed in column 306 provides information regarding which hardware and/or software is involved in the failure. For example, a node may indicate the failure occurred within Data Processing System A 12. The exemplary identifiers included within column 306 of FIG. 3A are taken from those shown in the cluster diagram of FIG. 5, as will be discussed in detail below. Finally, text in column 308 provides a high level description of the alarm. The information provided within the status display of FIG. 3A allows a user to efficiently determine a source of a failure so that the failure may be addressed.

In one embodiment of the invention, by selecting the alarm text in column 308, as may be done by "right-clicking" with a mouse button, the operator can use a pop-up window as shown in FIG. 3B to take actions with respect to the alarm.

FIG. 3B is a window used for viewing more detailed alarm information. For the selected alarm, the operator can view the alarm detail, clear the alarm, open a remote desktop session to the particular system, or "node", within the configuration that raised the alarm, or view the logs for the node with the alarm.

If the operator selects "Alarm Detail" from the menu, a window such as the one shown in FIG. 3C opens, giving the operator more details about the alarm.

In one embodiment of the invention, the use of icon families as discussed above is enabled using an alarm behavior and display selection menu. This selection menu is discussed further in the following paragraphs.

FIG. 4A illustrates a window for configuring various attributes associated with displaying alarm icons. In this window, each of the rows 400 through 410 relates to a respective type, or category, of alarm. This alarm type is listed in column 412. In the current example, six alarm types are defined. However, more or fewer types may be employed if desired. As discussed above, a first alarm type relates to those alarms raised by systems in the current configuration. This alarm type is designated "Configuration" alarms shown in row 400. Other alarm types include those associated with specific subsets of the enterprise computing environment, as indicated in rows 402 through 408. Another alarm type, designated "Other" alarms in row 410, includes those alarms not associated with the current configuration. These alarms are handled by another operations console, and are provided largely for redundancy reasons.

Alarm icon selection is supported in column 414. According to the current invention, a user may select a different icon family to be associated with each type of alarm. For example, in column 400, the icon family named "Lights95" is selected for use in displaying the configuration type alarms. This may correspond to the family shown in FIG. 2C, for instance. In rows 402 through 408, the icon family referred to as ConfigClassic90 is selected to provide information related to the alarms for "TestFloor", "ProdEast", "ProdWest", and "ProdSouth" alarms. In row 410, the icon family referred to as "Sign50" is selected to provide information related to the "Other" alarms.

Column 416 is used to enable the display of severity counts. As discussed above, severity counts provide a textual summary of the number and type of unseen alarms that are associated with a displayed icon. For example, the exemplary summary display screen of FIG. 2F shows severity counts 284 providing a summary of the type and number of the unseen configuration alarms associated with icon 280. Similarly, severity counts 286 provide more information related to a second category of alarms that are represented by icon 282.

Column 418 is employed to enable the use of various icons to display alarm severities in accordance with the current invention. When "Show Severities" is enabled for a given alarm type, the entire family of icons is used to communicate alarm severities. The presence of the most severe unseen alarm within the configuration will be communicated by displaying an icon representing the appropriate severity level. For example, assume the family of icons shown in FIG. 2B is selected as the default icon family and "Show Severities" is selected in column 418 of row 402. Assume further that the most severe unseen alarm in the configuration is a major alarm. As a result, icon 230 is selected to represent the configuration alarm.

If the Show Severities feature is disabled, a selected threshold setting will be displayed within column 418. For example, in row 410, "1-indeterminate" is displayed. This indicates that an alarm having a severity of "indeterminate" or higher will cause the icon for "alarm" to be displayed. Otherwise the icon for "no alarm" will be displayed. This threshold setting is user selectable, and may be any of the alarm severity levels defined within the system.

From a review of column 418, it may be noted that alarm severity levels may be associated with a number. For example, "1-indeterminate" shown in column 418, row 410, indicates that the "indeterminate" severity level is selected as the threshold, and further reminds the operator that this severity level is defined as the least severe level in the system. Other levels include "2-informational", "3-warning", and etc. These number tags help the operator remember which severity levels are more important.

Continuing with a discussion of column 420, the "raise window severity" function is considered. This function is used to select thresholds for raising the main alarm window to the top of the set of windows on the operator's screen. As is known in the art, multiple display windows may be stacked on top of each other in a display. If this is the case, modified data displayed in a bottom window may go unnoticed until an operator toggles through the windows and notices the new information. To remedy this situation, the current feature causes the summary display window to rise to the top of the "display stack" when a new alarm occurs having a severity that is at, or higher than, the specified severity level. As a result, the window will be fully displayed so that the operator is alerted of new alarms of sufficiently high severity level. Additionally, the use of the thresholds prevents the operator from being interrupted by the arrival of alarms of low severity, since a window displaying an alarm that is below the configured severity threshold is not moved, and may therefore be covered by a window in which the operator is working.

In the current example, the threshold for "Configuration" type alarms in row 400 is selected as "3-warning" in column 420. This means that the main alarm window will not be raised to the top of the window stack if a new alarm having a severity less than "warning" is raised. As a further example, for "Other" alarms in row 410, "none" is selected in column 420. Therefore, when an "Other" type alarm is raised, the main alarm window will not be raised to the top of the window display stack, regardless of its severity.

According to one embodiment of the current invention, audio files such as wave files are used to generate sounds that correspond to an alarm. For example, a critical alarm may cause a loud siren sound to be played. A less severe alarm may be cause an intermittent "beeping" sound. Any type of audio characteristic including volume and pitch may be used to distinguish between alarms. In another embodiment, spoken words may be used to describe the problem. By following a consistent convention, these audio characteristics may also be used for distinguishing among alarm severities.

Column 422 allows a user to select the family of audio files for use in playing the alarm severity. The use of the members of the audio family to convey alarm status is governed by the settings in columns 424 through 430 of FIG. 4A and by the sound mode 432 in FIG. 4B, which is described further below.

Column 422 may also select a video family. Each member of a video family may be regarded as consisting of a visual component and an audio component. The visual component of each member may be a prepared file or a live video feed, for example, from a security camera in the monitored facility. If a video family is selected, a screen area associated with the icon will show a video image that is associated with an alarm severity level in a manner similar to that discussed above with respect to the icons. The control of the display as shown in column 418 based on alarm severity also applies to the visual component of the video family. If the video is not a continuous live feed, the visual component video file will be played repeatedly. Additionally, sound associated with the video will be played in accordance with the settings designated in columns 424 through 430.

The capability to use audio characteristics to distinguish alarm severities is governed, in part, by the "Sound Threshold" feature of column 424. In one embodiment of the invention, this capability uses the cumulative alarm state together with thresholds representing severity levels in a manner similar to that discussed above regarding the "Show Severities" feature. That is, the generated sound corresponds to the highest unseen alarm for the associated alarm type. However, the sound is only played if the highest unseen alarm is of a severity at least as great as the sound threshold. This avoids creating an audible distraction upon receipt of lower-priority alarms. For example, the value "5-major" in row 406 indicates that for the "ProdWest" type of alarms, the sound will only be played when the highest unseen alarm is a major or more severe alarm. The sound that is played will be the corresponding member of the sound family "high-voice", as shown in column 422, row 406. The sound might be, for example, a high-pitched human voice saying "major alarm in the west building" for an alarm having a severity level of "major", for example.

According to one embodiment of the invention, if "Show Severities" is the feature used in column 418 for the alarm icon, then the sound threshold in column 424 is applied independently, as described above. However, if a threshold is used in column 418, such as "1-indeterminate" in row 410, the sound threshold in column 424 is set to the same value, to avoid potential confusion for the human user of the system. Thus, for example, the sound threshold "1-indeterminate" in column 424, row 410, indicates that the sound will be played, subject to further qualifications in columns 426 through 430 and 432, whenever the highest unseen alarm has severity "indeterminate" or higher. This corresponds to the definition in column 418, row 410, which dictates that the "alarm" icon will be displayed whenever the highest unseen alarm has severity "indeterminate" or higher. Sound thresholds may be disabled by selecting a threshold of "none", as shown in column 424, row 402. This indicates that regardless of other conditions, no sound is to be played.

Column 426 allows a sound to be played repetitively. Sound repetition may be disabled by selecting "none", as shown in column 426, row 402. The sound may also be repeated a fixed number of times, with a rest of a certain time interval between repetitions, as shown in row 400. This example indicates that the sound or video will be played at most twice, with a delay of 60 seconds between repetitions. During the interval between occurrences of playing a sound, the operator's workstation is silent, unless sounds from another alarm category are playing, as discussed below. Alternatively, the sound may be played continuously, as may be desirable for critical or other high-severity alarms. Playing continuously with no delay between repetitions is shown by "endless" in row 404. This may be especially appropriate for a warning sound, as suggested by "panicbuzzer" in column 422, row 404. Playing an unlimited number of times with a 15 second delay between repetitions is shown by "endless, wait 15" in row 406. This may be especially appropriate for spoken announcements, allowing time for the listener to comprehend the meaning of the words before repeating.

At any time, an alarm could be cleared, marked "seen", or acknowledged, causing the sound to terminate. The workstation may then be silent or another sound alarm may be played, as controlled by the information in column 428.

Column 428 allows a user to select a sound trigger to be used if the sound function has been enabled by the user, as governed by the information in columns 422, 424, and 426. In one instance, an audio file may be played as each alarm is raised, if the alarm has a severity that is not lower than the threshold configured in column 424. This "new alarm" sound trigger is shown being selected in column 428, row 410. In contrast with other aspects of this invention, which use the level of the highest unseen alarm to govern the notification level, "new alarm" plays a sound corresponding to the severity of the new alarm, even if it is not the highest unseen alarm. An example of a sound family member for this sound trigger might be a short beep, with the beep pitch, duration, or volume corresponding to the alarm severity, as suggested by the family "beeper" in column 422, row 410. Although the icon family for this alarm category only uses the "alarm" and "no alarm" icons, as explained above and indicated by the "1-indeterminate" selection in column 18, the severity count display 416 and the sound family work together to notify the operator of the severity of new and past alarms.

In contrast to playing a sound as each alarm is raised for all alarms having at least a predetermined severity level, another option allows an audio file to be played only when an alarm is raised that has a higher severity that all other unseen alarms within the alarm category. This "level increase" sound trigger is shown selected in row 404.

According to another aspect of the invention, the user may want a sound notification when the level of the highest unseen alarm in the system increases or decreases. This type of selection, which is shown in column 428, row 406 as "level change", may best be understood by example. Row 406 includes the threshold setting of "5-major" in column 424. This setting will cause a corresponding member of the "high-voice" sound family to be played when any alarm of severity "major" or higher is raised, as is discussed above. If, for example, a critical alarm is received for the "Prod-West" alarm category, a female voice saying "Critical alarm" may be triggered. Because of the selection of "endless, wait 15" in column 426, this alarm message will be repeated. During this time, arrival of another alarm of critical or lower priority will not trigger another alarm sound. Next, assume that through operator intervention or automated action, the highest priority level for an unseen alarm falls from "critical" to "major". Because of the selection in column 428 of "level change", the "major" sound in the "high-voice" family is played. It will be noted that if the "level increase" setting had instead been selected in column 428, the decrease in the severity level would have caused the sound alarm to stop playing. Finally, if the sound trigger is "none" as shown in rows 402 and 408, then no sound will be played.

The Sound Priority in column 430 is used together with the Sound Mode features illustrated in FIG. 4B to control system behavior when the potential for multiple simultaneous sounds exists. The designations "A", "B", etc. in column 430 indicate the relative priority of the alarm categories in the corresponding rows. For example, the "Configuration" alarm category, row 400, has sound priority "A", which is the highest priority, "B" which is next highest, and etc. A hyphen, or "-", in this column indicates that the sound priority is undefined for the associated alarm category. The use of these priority levels is discussed further below in reference to FIG. 4B.

FIG. 4B is a diagram illustrating a window that allows selection of a sound mode. Modes include "Interleave" 432, "Override" 434, "Serialize" 436, and "Simultaneous" 438. These modes are used in conjunction with the sound priority in column 430 of FIG. 4A to control system behavior when the potential for multiple simultaneous sounds exists. "Interleave" mode 432 allows two or more alarm categories to play sounds in round-robin fashion, in the order of their priorities indicated in column 430 of FIG. 4A. If a new alarm causes another sound to be played, it will be inserted into the list and played in priority order. Each sound will be played the number of times indicated by the Sound Repetition value indicated in column 426 of FIG. 4A. The "wait" portion of the sound repetition choice is applied to repetitions of that specific sound. For example, assume an alarm is raised in the "Configuration" category and plays once. Next, an alarm is raised in the "Other category" and plays once. The alarm in the "Configuration" category will be played a second time no earlier than 60 seconds after that alarm finished playing the first time. This second playing may be delayed more than 60 seconds if another alarm is playing when the 60-second wait time expires. Using the "Interleave" setting, no single playing of a sound is interrupted by the arrival of another sound-enabled alarm. It will, however, be interrupted by the alarm being cleared, acknowledged, or "seen".

The sound modes of FIG. 4B further includes "Override" mode 434. This mode allows two or more alarm categories to play sounds in a round-robin fashion in the order of their priorities in a manner similar to "Interleave" mode. Unlike "Interleave" mode, however, "Override" mode discontinues the playing of an alarm sound upon the arrival of a higher-priority sound-enabled alarm. When playing of the lower-priority alarm sound resumes, it starts over at the beginning of the interrupted sound.

"Serialize" mode 436 is yet another sound mode available within one embodiment of the current system. When this mode is enabled and two or more alarm categories have sounds to play, the highest priority sound will play according to its Sound Repetition indicated in column 426. The next highest priority sound will then play according to its own Sound Repetition choice, and so on until all have played. A Sound Repetition choice of "endless" prevents lower priority sounds from playing until a higher priority alarm has been cleared, acknowledged, or seen. As with "Override" 434, arrival of a higher priority sound-enabled alarm stops the playing of any lower priority alarm sound and starts the playing of the new higher-priority alarm sound.

Still another sound mode is "Simultaneous" mode 438. This mode allows sounds from multiple sound-enabled alarms to be played concurrently. Those skilled in the art will appreciate that current technology supports the playing of multiple sounds simultaneously on a sound output devices in this manner. The sound repetition definition of each will apply independently of the others.

The above-described configuration windows of FIGS. 4A and 4B will be understood to be merely exemplary, and many other types of menus are, of course, possible. In one embodiment, menu selections are made by "clicking" within the menu screen to toggle a menu item. For example, by clicking on an item within column 408, the selection toggles from "show severities" to "none". Alternatively, selections may be made using drop down menu bars.

Figure 5:
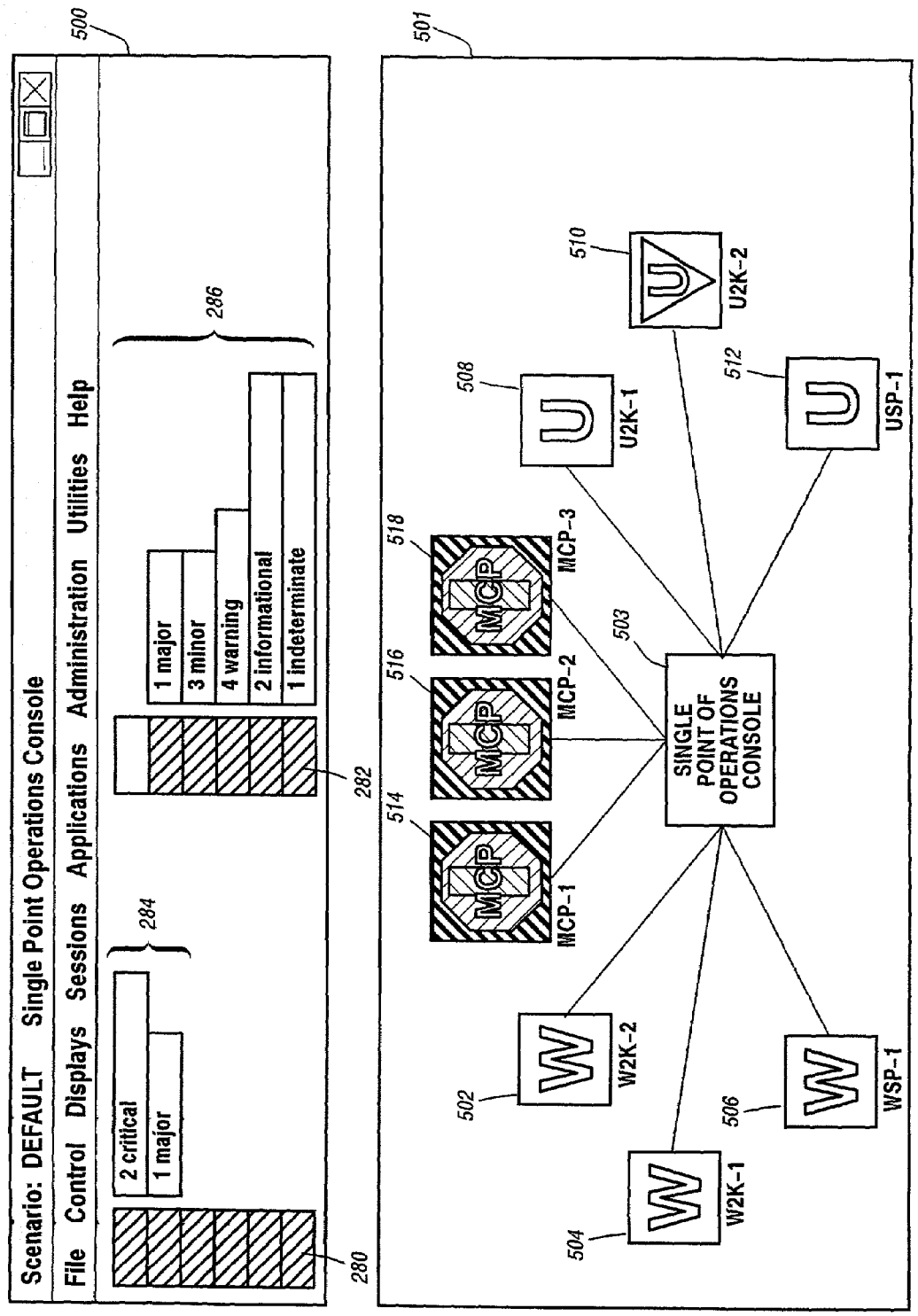
FIG. 5 is a tiled screen display that includes a first window having an alarm summary screen and a second window illustrating a cluster diagram.

FIG. 5 is a tiled screen display that includes a first window 500 having an alarm summary screen and a second window 501 illustrating a cluster diagram. These windows can be sized and positioned within the screen display based on user preferences. More than two windows can be displayed on the screen at once, if desired.

The alarm summary screen in window 500 is the same as that shown in FIG. 2F, and utilizes the family of icons from FIG. 2C in the manner discussed above.

The cluster diagram shown in window 501 is a visual depiction of the configuration that is being monitored by the operations console, which is represented in block 503 of the diagram. In the current example, operations console in block 503 monitors three Windows servers represented by blocks 502 through 506, respectively. Operations console is further monitoring three Unix systems, as shown in blocks 508 through 512, respectively. Finally, operations console monitors three MCP systems or partitions commercially available from Unisys Corporation, shown in blocks 514 through 518. It is understood that more or fewer partitions may be included in the configuration, and partition types may be added or deleted from the configuration.

Each of the represented partitions is shown labeled with a partition name. For example, block 502 corresponds to windows partition "W2K-2". This name may be listed in column 306 of the screen display discussed above in reference to FIG. 3A to identify a partition raising an alarm.

According to one embodiment, each of the partitions in a cluster diagram can be associated with a user-selected icon family. Generally, an icon family will be selected to identify a type of partition in the cluster diagram. For example, an icon family such as that shown in FIG. 2E may be selected to identify alarms raised by any of the MCP partitions in the configuration. In FIG. 5, this icon family is selected to represent all of the MCP partitions in the configuration. Recall that each icon in the icon family of FIG. 2E includes the letters "MCP" displayed in the icon foreground, with background colors and symbols being selected to further identify an alarm severity level. This allows the operator to both readily identify an alarm severity level while also determining the type of system that raised the alarm.

According to one embodiment, a cluster diagram such as that shown in window 501 may be configured using a window similar to that shown in FIG. 4. This window may allow a user to select an icon family to be used to display alarm severity levels for each partition in the configuration. This is similar to the way in which an icon family is selected for an alarm type in the window of FIG. 4. Some partitions may be associated with a single icon family, if desired. For example, all Windows partitions may be associated with an icon family that displays a large "W" in the foreground, as is shown in FIG. 5. In this type of an icon family, the background colors and shapes identify alarm severity levels. Similarly, all Unix partitions may be associated with an icon family that displays a "U" in the foreground, as shown in FIG. 5.

In the cluster diagram illustrated in window 501, it will be assumed that MCP partitions MCP-2 and MCP-3 have raised critical alarms, and that MCP-1 is in a "normal" state and has not raised any alarms. Therefore, icon 272 of FIG. 2E is displayed in blocks 516 and 518 to indicate the existence of the critical alarms, whereas MCP icon 274 is displayed in block 514 to indicate the normal state. It will further be assumed that a second alarm icon family has been selected to display alarms raised by each of the Windows partitions represented by blocks 502 through 506. Further, it will be assumed each of these partitions is in a "normal" state as represented by an icon including a single "W". Similarly, it will be assumed that a third alarm icon family has been selected to represent alarm severity levels for each of the Unix partitions depicted by blocks 508 through 512. In this example, the partitions shown by blocks 508 and 512 are in a normal state, which is represented by an icon having a single "U" in the foreground. However, partition U2K-2 has raised a major alarm, which, in the selected icon family, is associated with a "U" superimposed over a "yield" sign. This icon is shown in block 510.

The foregoing example illustrates the manner in which each partition of a cluster diagram may be associated with a respective icon family. In this example, one major and two critical alarms are raised within the configuration.

Although the above example uses partition identifying icon families such as those shown in FIG. 2E, this need not be the case. Any other icon family such as those shown in FIGS. 2A through 2D could instead be selected to depict an alarm severity level for a given partition. In this case, however, it is likely desirable to rename the "no alarm" icon such as icon 200 of FIG. 2A to the "normal" icon such as that shown as icon 274 of FIG. 2E. Similarly, an icon such as icon 260 of FIG. 2E should be chosen or created to represent the "inactive state". This provides an icon family that corresponds to conventions that are preferable for use in cluster diagrams.

It will be noted that the information provided by the cluster diagram in window 501 corresponds to the information provided by window 500. Specifically, icon 280 and severity counts 284 of window 500 represent the configuration-type alarms. The severity counts 284 identify the existence of two critical and one major unseen alarms. Further, icon 280 indicates that a critical alarm is the most severe unseen alarm in the configuration. If desired, the icon family selected for use in representing the configuration-type alarms in window 500 could be the same as any of the alarm icon families selected for use within the cluster diagram. This example therefore further illustrates the manner in which a summary alarm display provides information that may be obtained in a more detailed manner using a cluster diagram.

In the embodiment of the cluster diagram described in the foregoing paragraphs, the highest alarm associated with any partition or host is displayed within the block representing the partition. As noted above, the operator may choose to use an icon family such as those shown in FIGS. 2A through 2D, or may choose an icon family that incorporate a representation of the node type.

As discussed above, the various icons shown in the cluster diagram and/or the alarm summary display of windows 501 and 500, respectively, may be re-sized by the user. Additionally, the windows themselves may be re-sized. If desired, for example, one of the windows may be sized to cover all, or a portion of, another one of the windows in the system.

Figure 6:
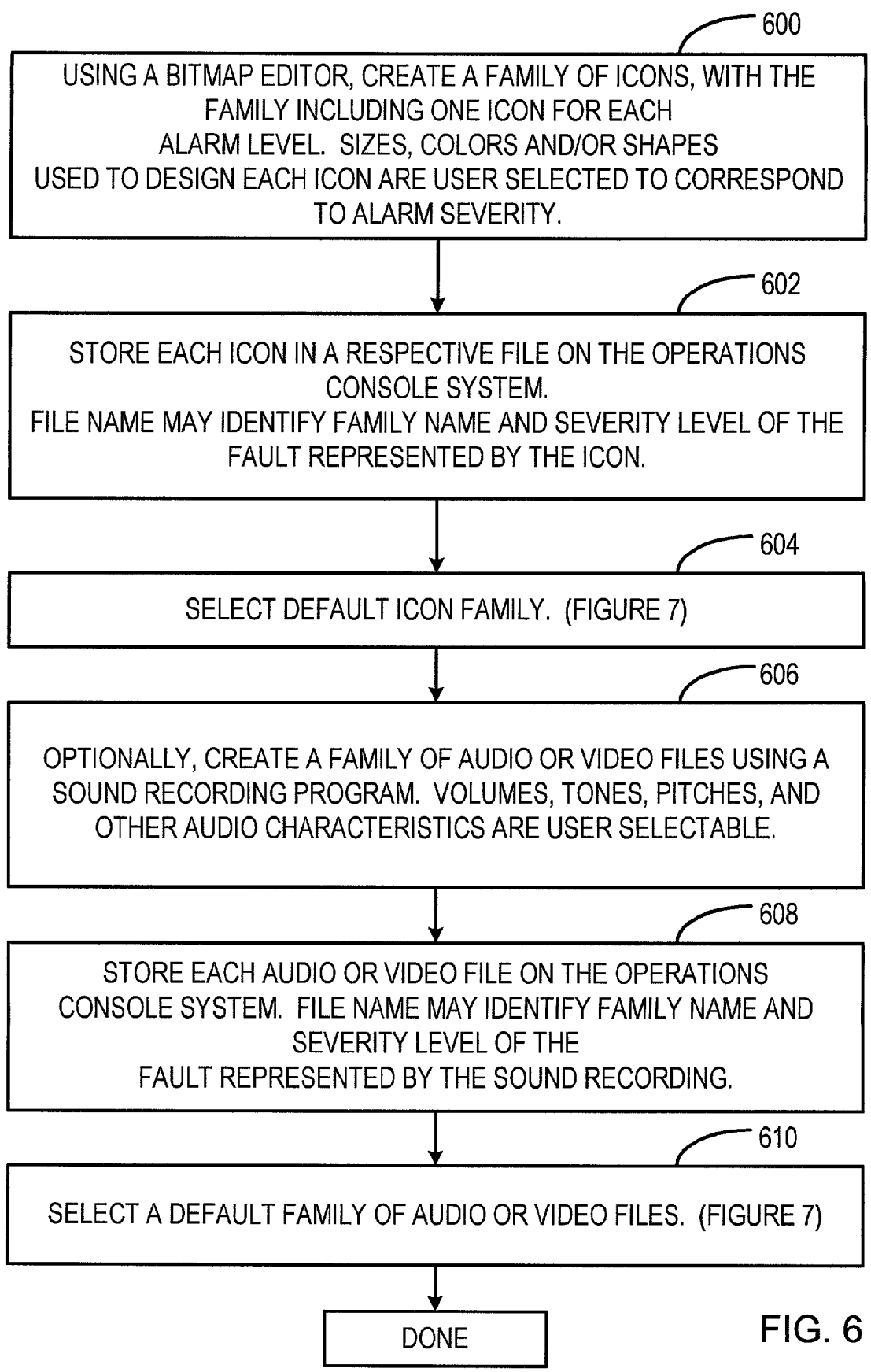
FIG. 6 is a flow diagram indicating a method of defining a family of icons to be used in accordance with the current invention.

FIG. 6 is a flow diagram indicating a method of defining a family of icons to be used in accordance with the current invention. A bitmap editor is used to create a family of icons (600). If desired, existing icons that are provided with operations console software may be modified, or entirely new icons may be created. The icons may include any shapes and/or colors, may be of any size, and may include any type of design pattern. A multi-tier approach may be utilized to, for example, employ background shapes, colors, and foreground symbols that each reinforce an alarm severity level, as was discussed above in reference to FIG. 2A.

After a family of icons has been created such that a unique icon exists for every alarm severity level defined within the system, these icons are stored in a predetermined folder, or directory, on the personal computer or workstation executing operations console 10 (602). In one embodiment of the invention, the bitmap files are assigned file names that identify the icon family and the alarm severity level. For example, an icon included within a family designated "family1" that is associated with a critical alarm may be saved within a file "family1.critical.png", and so on. The use of this naming convention allows operations console to display an appropriate icon.

After the newly created icon family is placed in the appropriate folder on the system, it may be selected as the default family for use in displaying severity levels associated with one or more of the alarm types defined within the system (604). This is discussed further below in reference to FIG. 7.

A user may also optionally create a family of wave files for use in playing alarm severities (606). These wave files may be created using any method known in the art, including using a sound recording program such as Microsoft Sound Recorder or Sonic Foundry Sound Forge to record sounds from other sources such as from a CD, microphone, or tape. Varying volumes, tones, pitches, and/or other audio characteristics may be used to create sounds that are unique for each alarm severity level. Alternatively, a microphone may be used to record a message including spoken words indicating a type of alarm. Other information may be provided in the audio message if desired, such as the action to be taken for a given alarm. These wave files may be stored to a predetermined folder on the system that is executing operations console 10 in a manner similar to that discussed above with respect to the bitmap files (608). In one embodiment, these files are stored using file names that identify the wave file family and the alarm severity. Returning to the example above, a wave file for a critical alarm may be named "family1.critical.wav". This type of naming convention is then used by the system to allow for easy selection and use of the files. After a newly created family of wave files is stored in the proper folder, it may be selected as the default family as discussed further below in reference to FIG. 7 (610).

Alternative embodiments of the method of FIG. 6 are possible within the scope of the current invention. For example, an audio file family may be correlated with an icon family so that selection of one or the other automatically selects both. This may be accomplished, for example, by using the same family name for the associated icon and audio families. As noted above, each icon in an icon family could be associated with a video file so that a video clip is displayed (and possibly re-displayed) within the screen area allotted for a given icon. These video files could be displayed using programs and platforms such as QuickTime commercially available from Apple Computer Corporation, Media Player commercially available from Microsoft Corporation, or RealMedia commercially available from RealNetworks Corporation.

Figure 7:
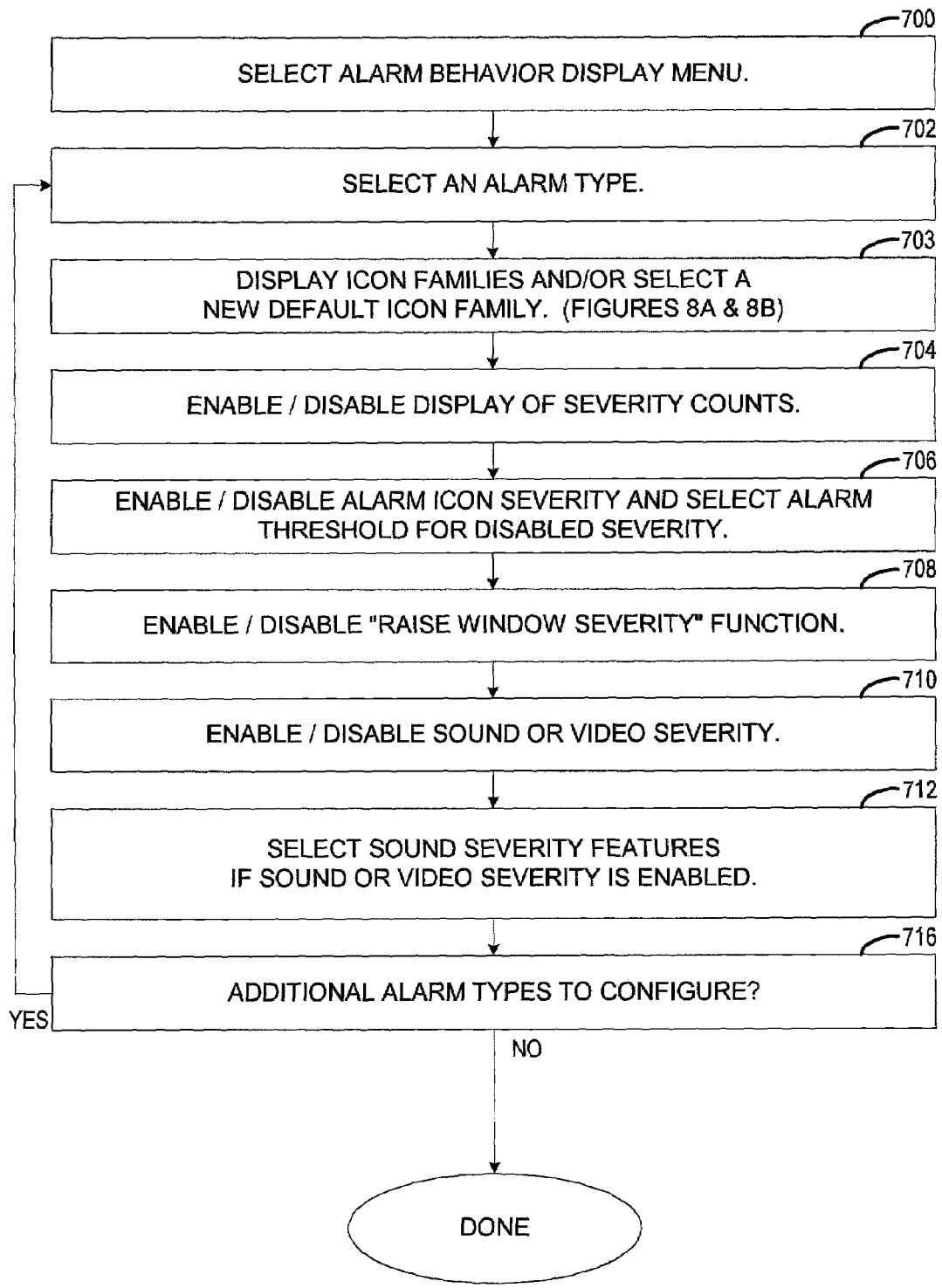
FIG. 7 is a flow diagram illustrating one method of configuring an operations console to utilize the icon and audio file families according to the current invention.

FIG. 7 is a flow diagram illustrating one method of configuring an operations console to utilize the icon and wave-file families according to the current invention. In one embodiment, the system includes an alarm behavior display window, which may be similar to that shown in FIG. 4A. After selecting this window (700), a user may select an alarm type to configure in the manner discussed above (702). For the selected alarm type, the available icon families within the system may be viewed, and a new default icon family may be selected for use according to the current invention (703). The manner of selecting this icon family is discussed further below in reference to FIGS. 8A and 8B. Next, a display of severity counts is enabled or disabled such that severity count data is either present or absent from the alarm summary display screen (704). Alarm icon severity may then be enabled, if desired, so that an appropriate alarm icon is used to convey alarm severity information (706). As discussed above, if the show severity feature is disabled, a threshold level is selected for use in displaying an "alarm" icon such as icon 214 of FIG. 2A when an alarm is raised that is the same or higher than the selected severity level. Additionally, the "raise window severity" function may be enabled so that thresholds can control the positioning of the alarm window relative to other windows on the operator's workstation display (708).

According to one embodiment of the invention, sound severity may be selectively enabled so that an audio file that may optionally be associated with video data may be played upon the occurrence of an alarm (710). If the play sound severities feature is enabled, other features associated with the playing of audio data may be selected, including sound threshold, sound repetition, sound trigger, sound priority, and sound mode (712). These options are discussed above in reference to FIGS. 4A and 4B. If additional alarm types remain to be configured (716), steps 702 through 712 may be repeated for an additional alarm type.

Figure 8A:
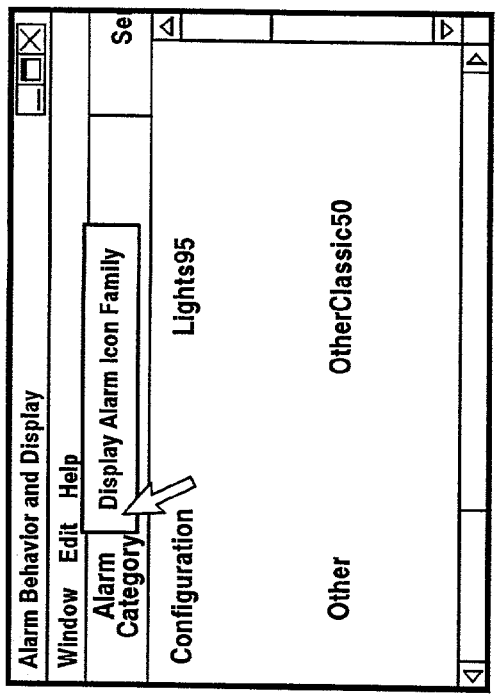
FIG. 8A is a partial view of the Alarm Behavior and Display window illustrated in FIG. 4, which further illustrates use of the "edit" feature to display available icon families.

FIG. 8A is a partial view of the Alarm Behavior and Display window illustrated in FIG. 4A, which further illustrates use of the "edit" feature. As shown in FIG. 8A, the edit function may be selected, as by using a "right click" of a mouse, to obtain the window shown in FIG. 8B.

Figure 8B:
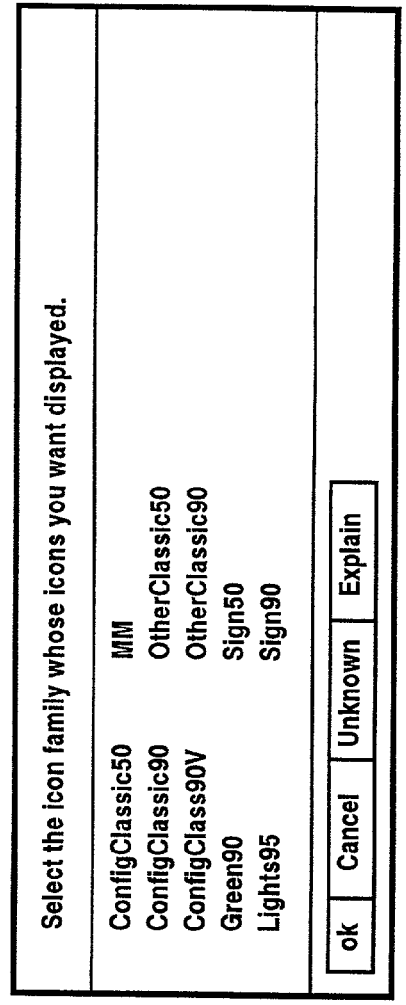
FIG. 8B is a window that allows a user to display any of the icon families available within the system.

FIG. 8B is a window that allows a user to display any of the icon families available within the system. An icon family is selected for display by "clicking" on the family name, then hitting the "ok" button. After displaying the icon family, the user may select a new default family.

Figure 8C:
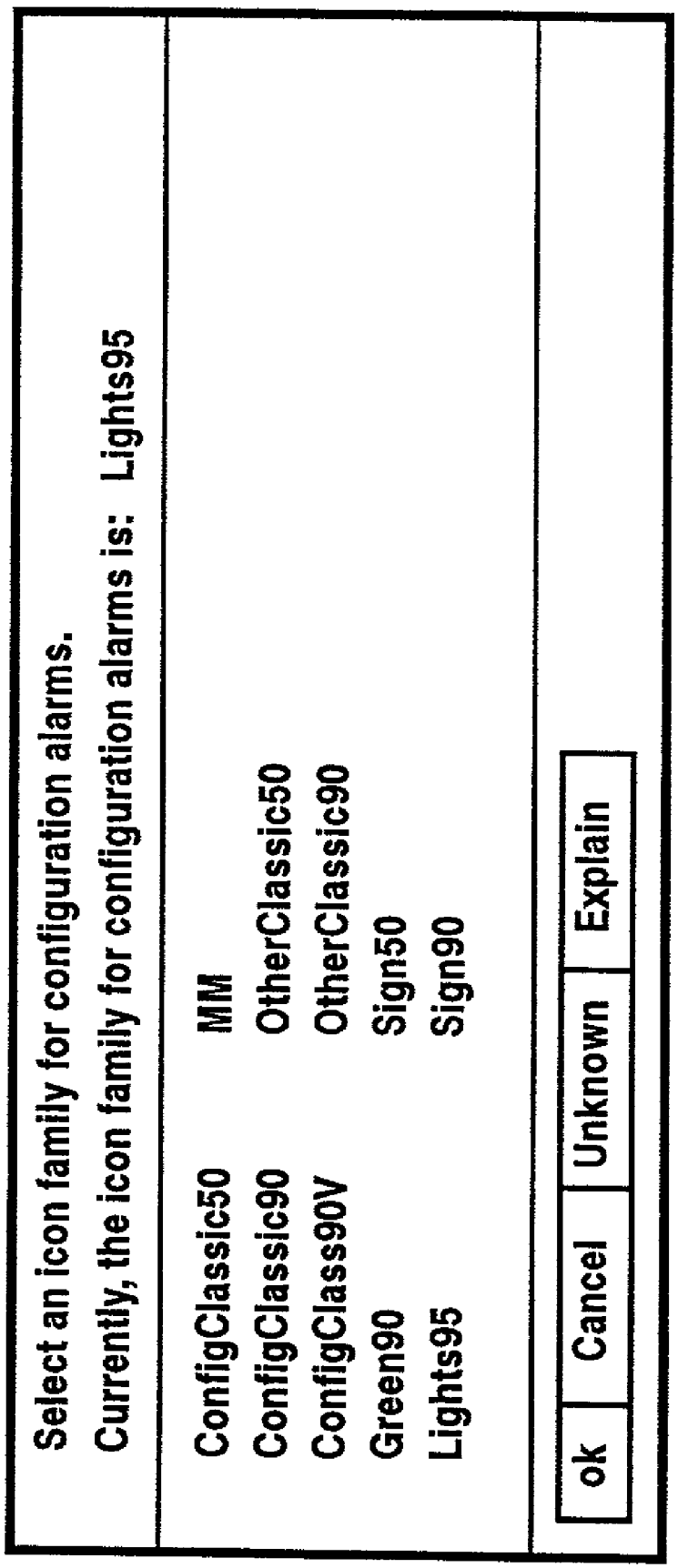
FIG. 8C is a window that allows a user to select a new default icon family.

FIG. 8C is a window that allows a user to select a new default icon family. This window may be obtained by "clicking" on the selected alarm icon family in column 414 of FIG. 4A. For example, to select a new alarm icon family for configuration-type alarms in row 400 of FIG. 4A, the "Lights95" family name may be selected to open the window shown in FIG. 8C. Then a new family name may be selected as the default.

Figure 9:
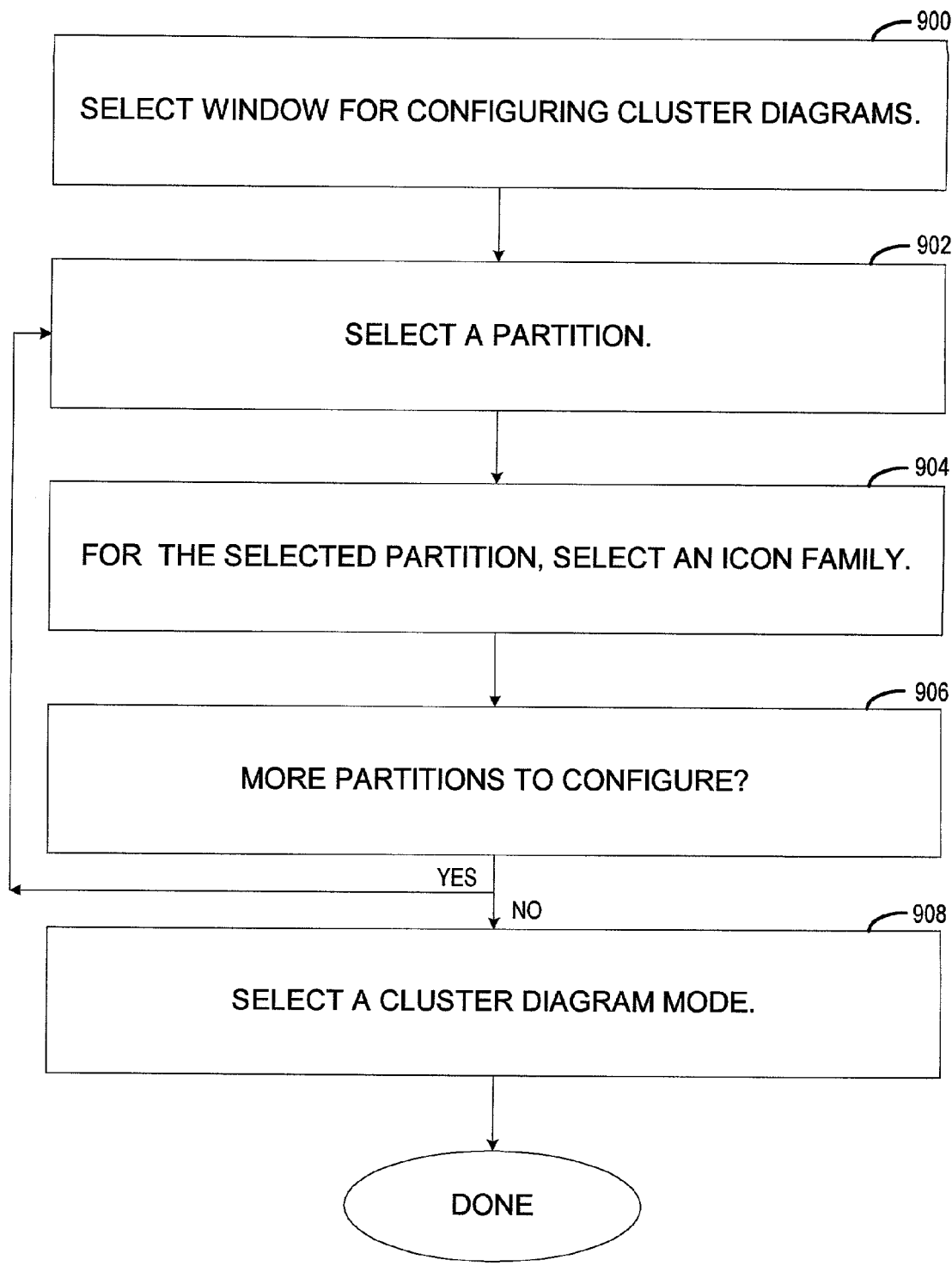
FIG. 9 is a method of configuring a cluster diagram to employ icon families according to the current invention.

FIG. 9 is a method of configuring a cluster diagram to employ icon families according to the current invention. First, the window for configuring a cluster diagram is selected (900). This window may be similar to that shown in FIG. 4A for configuring alarm types. Next, this window is used to select a partition within the monitored configuration (902). Any of the partitions available within the configuration are available for selection. For the selected partition, an icon family may be chosen using a process and menus similar to those discussed above in reference to FIGS. 8A through 8C (904). If more partitions have yet to be configured (906), processing continues with step 902. Otherwise, the cluster diagram mode may be selected (908). As shown in FIG. 5, a "highest severity by partition" mode may be used to display, for each partition, an icon representing the most severe unseen alarm raised by that partition. Alternatively, a "highest severity by configuration" mode may be employed to display only those unseen alarms that are the most severe alarms within the configuration.

FIG. 10 is a system block diagram of one embodiment of an operations console as may be used to implement the current invention. Operations console may be any type of personal computer or workstation. Operations console 1000 includes a processor 1002, which may be a microprocessor or any other processing circuit. Processor 1002 is coupled to a storage device 1004 to store executable instructions and data signals such as those included within the family of files that are defined according to the current invention. Operations console 1000 is coupled to at least one input device 1005 such as a keyboard, mouse, touch screen, microphone, or any other type of input device. This input device receives input from a user that may be used to create the icon families and audio file families as described herein.

FIG. 10 further includes at least one file creation device 1006 shown coupled to operations console 1000, although it may be incorporated into the operations console in another embodiment. The one or more file creation devices are used to create any of the family of files, such as the icon families, the audio file families, or the audio/video families. In one embodiment, file creation device 1006 may be a bitmap editor, a sound recorder, or a video recorder. Finally, operations console 1002 is coupled to at least one output device 1008 such as a screen display, speakers, or some other device to transmit signals generated from data that is included within a file selected from a created family of files.

It will be appreciated that the windows and menus described herein are largely exemplary in nature, with the various display configurations, menu windows, and naming conventions being largely arbitrary. It may further be noted that the methods described herein are exemplary in nature, with ordering of the various steps being, in most cases, arbitrary. Finally, it will be appreciated that although the current invention is described within the context of an operations console monitoring one or more data processing systems, the concepts described herein could be adapted for other environments. For example, a system similar to the operations console described herein may be used to monitor one or more manufacturing processes and/or machines. Therefore, the particular embodiment involving the use of an operations console to monitor data processing systems should be considered merely exemplary, and not limiting, and it will be understood that many other embodiments are possible within the scope of the current invention.

What is claimed is:

1. For use by an operations console that is coupled to multiple data processing systems to obtain an existing alarm severity level for each of the data processing systems, wherein the existing alarm severity level is selected from a set of predefined alarm severity levels, a method comprising:
defining multiple different Icon families that each includes an associated icon for each of the predefined alarm severity levels;
associating each data processing system with any one of the icon families in a manner that does not require consideration of any system types; and
displaying an icon from one of the icon families, the displayed icon being indicative of the existing alarm severity level within an associated data processing system.

2. The method of claim 1 and further including selecting one of the multiple icon families as a default icon family to be used in displaying the icon.

3. The method of claim 1, wherein each of the icon families includes a different an icon that is respectively associated with each of the defined alarm severity levels, and further including displaying an icon from the icon family that is respectively associated with the existing alarm severity level of the associated data processing system.

4. The method of claim 1, wherein the operations console is capable of receiving one or more alarms from the at least one data processing system, and further including:
receiving a first alarm from the associated data processing system, the first alarm indicating a first one of the defined alarm severity levels; and
selecting the first one of the defined alarm severity levels as the existing alarm severity level.

5. The method of claim 4, and including:
receiving a second alarm from the associated data processing system, wherein the second alarm indicates a second one of the defined alarm severity levels that is different from the first one of the defined alarm severity levels; and
selecting as the existing alarm severity level the most severe of the first one and the second one of the defined alarm severity levels.

6. The method of claim 4, and including:
allowing a user of the operations console to selectively discontinue displaying the icon that is indicative of the existing alarm severity level; and
displaying an icon from the icon family that indicates the occurrence of the first alarm without identifying the first one of the alarm severity levels.

7. The method of claim 4, and including:
allowing a user of the operations console to selectively discontinue displaying the icon that is indicative of the existing alarm severity level;
allowing the user to select one of the predefined alarm severity levels as a threshold; and
displaying an alarm icon from the icon family that indicates the occurrence of the first alarm without identifying the first one of the alarm severity levels, the alarm icon being displayed only if the first one of the alarm severity levels has a predetermined relationship to the threshold.

8. The method of claim 7, wherein an alarm icon from the default icon family is displayed only if the first one of the alarm severity levels is greater than, or equal to, the threshold.

9. The method of claim 8, and further including displaying an icon that indicates the absence of the first alarm if the first one of the alarm severity levels does not have a predetermined relationship to the threshold.

10. The method of claim 1, wherein multiple alarm types exist, and further including:
selecting a respective one of the multiple icon families for each of the multiple alarm types;
determining an existing alarm severity level for each of the multiple alarm types; and
displaying, for each of the multiple alarm types, an icon from the respective icon family that is associated with the existing alarm severity level for the alarm type.

11. The method of claim 1, wherein wherein defining an icon family includes distinguishing each icon in the icon family from all other icons in the icon family using at least one of the attributes selected from the group consisting of background color, background symbol, foreground color, foreground symbol, icon size, degree of shading, and type of patterns included within an icon.

12. The method of claim 1, further including defining an icon family to identify a type of data processing system.

13. The method of claim 1, and further including:
selecting ones of the multiple data processing systems for inclusion in a cluster diagram;
selecting, for each of selected ones of the multiple data processing systems, a respective one of the icon families;
determining, for each of the selected ones of the multiple data process systems, an alarm severity level; and
displaying, for each of the selected ones of the multiple data processing systems, an associated icon selected from the respective one of the icon families and indicating the alarm severity level determined for the data processing system.

14. The method of claim 13, wherein the step of selecting an icon family includes selecting an icon family that identifies a system type of the respective system.

15. The method of claim 1, wherein defining an icon family includes selecting, for each icon in the icon family, a background pattern, a background color, and a foreground symbol.

16. The method of claim 1, wherein step defining an icon family includes selecting symbols having recognizable meanings for inclusion in ones of the icons of the icon family.

17. The method of claim 16, wherein step defining an icon family includes selecting the symbols from the group consisting of road signs, the alphabet, numbers, and punctuation marks.

18. The method of claim 1, further including allowing a user to employ a bitmap editor to define the icon families.

19. The method of claim 18, further including providing at least one predefined icon family available for use by an end-user of the operations console.

20. The method of claim 1, and further including:
defining an audio family that includes an audio file associated with each of the predefined alarm states; and
playing an audio file from the audio family to indicate the existing alarm state.

21. The method of claim 20, and further including repeating the playing of the audio file at a selected time interval.

22. The method of claim 1, and further including:
defining a video family that includes an video file associated with each of the predefined alarm states; and
displaying a video file from the video family to indicate the existing alarm state.

23. An automated system to monitor a state of one or more data processing systems, wherein the state may be any one of a predefined set of states, the system including:
a storage device to store multiple different families of files, each of the files within a family being respectively associated with a different one of the states in the predefined set of states;
a processor coupled to the storage device to associate each of the one or more data processing systems with any of the multiple different families of files in a manner that is irrespective of system type, and for each of the data processing systems, the processor to determine the state of the data processing system and to selected a respectively associated file from a family of files that is associated with the data processing system; and
an output device coupled to the storage device to translate data included within the selected files into a format that may be sensed by a user of the automated system to perceive the determined state of each of the data processing systems.

24. The system of claim 23, wherein the output device is a display screen capable of generating a visual representation of the data included within the selected file.

25. The system of claim 23, wherein the output device is a speaker capable of playing an audio representation of the data included within the selected file.

26. The system of claim 23, wherein one of the families of files may be selected as a default family that is used by the processor in selecting a file.

27. The system of claim 26, and further including an input device coupled to the processor to allow a user to select the default family.

28. The system of claim 23, and further including a file creation device coupled to the storage device to allow a user to create one or more of the families of files.

29. The system of claim 28, wherein the file creation device is a bitmap editor.

30. The system of claim 28, wherein the file creation device is a device to create an audio file.

31. The system of claim 28, wherein the file creation device is a device to create an audio/video file.

32. The system of claim 28, wherein the file creation device includes means for creating a family of files such that each file in the family of files includes at least one characteristic indicative of a respectively associated one of the states, the characteristic being selected from the group consisting of color, size, visual symbols, visual patterns, audio tones, and audio volume.

33. The system of claim 28, wherein the file creation device includes means for creating a file that represents a type of data processing system.

34. The system of claim 33, wherein the processor includes means for selecting a respective one of the one or more families of files for each of the one or more data processing systems, and for further determining a state for each of the one or more data processing systems; and
wherein the output device includes means for displaying, for each of the one or more data processing systems, a visual representation generated from data included within a file that is selected from the respective one of the family of files and that is respectively associated with the determined state.

35. The system of claim 23, wherein each of the one or more data processing systems is capable of raising alarms, each alarm having a severity level selected from a set of predefined severity levels, and wherein each of the files in each of the families of files indicates a respective one of the predefined severity levels.

36. The system of claim 35, and further including software means for causing the processor to determine the state of each of the one or more data processing systems by selecting a severity level of a raised alarm that is not lower than a severity level of another raised alarm.

37. The system of claim 36, wherein the software means includes means for causing the processor to determine the state of each of the one or more data processing systems by selecting a severity level of a raised alarm that is not lower than a severity level of another raised alarm only if the raised alarm has not yet been acknowledged by a user of the system.

38. A system to monitor one or more data processing systems, wherein a set of states is defined to describe the one or more data processing system, the system including:
a file creation device to allow a user of the system to create one or more different families of files, each of the files in a family being associated with a state included within the set of states;
an operations console coupled to the file creation device, the operations console to associate a respective family of files with each of the data processing systems without regard as to whether or not the respective family of files has been associated with any of the other data processing systems, and to select a file from one of the families of files that describes a state of an associated system; and
an output device coupled to the operations console to utilize data included within the selected file to generate one of more signals that may be perceived by a user of the system.

39. The system of claim 38, and further including an input device coupled to the operations console to allow a user to select one of the family of files as a default family, and wherein the selected file is selected from the default family of files.

40. The system of claim 38, wherein the file creation device is selected from the group consisting of a sound recording device, a video recording device, and a bitmap editor.

41. The system of claim 38, wherein the output device is selected from the group consisting of a display screen and an audio device.

42. The system of claim 38, wherein the file creation device is a sound recording device to create a family of audio files, each of the audio files being respectively associated with a state included within the set of states, wherein the output device is an audio device to generate an audio signal, and wherein the operations console includes means for selectively enabling the output device to generate the audio signal.

43. The system of claim 42, wherein the operations console further includes:
  means for selecting one of the states included within the set of states as a threshold; and
  means for selectively enabling the output device to generate the audio signal only if the state describing the one or more other systems has a predetermined relationship to the threshold.

44. The system of claim 42, wherein the operations console further includes:
  means for selecting multiple files from any of the one or more families of files, each of the selected multiple files being associated with a state describing respective ones of the one or more other data processing systems; and
  means for selectively enabling the output device to generate an audio signal for each of the multiple files.

45. The system of claim 44, wherein the means for selectively enabling the output device to generate an audio signal for each of the selected multiple files includes means for allowing a user to select a sound mode to determine a manner in which the audio signals are played with respect to one another.

46. The system of claim 44, wherein the means for selectively enabling the output device to generate an audio signal for each of the multiple files includes means for allowing a user to select a sound priority to determine an order in which the audio signals are played.

47. The system of claim 42, wherein the operations console includes means for causing the output device to generate the audio signal repetitiously.

* * * * *

UNITED STATES PATENT AND TRADEMARK OFFICE
CERTIFICATE OF CORRECTION

PATENT NO. : 7,137,074 B1 Page 1 of 1
APPLICATION NO. : 10/160715
DATED : November 14, 2006
INVENTOR(S) : Glen E. Newton et al.

It is certified that error appears in the above-identified patent and that said Letters Patent is hereby corrected as shown below:

Claim 44, Column 24, line 6 delete "other"

Signed and Sealed this

Tenth Day of June, 2008

JON W. DUDAS
*Director of the United States Patent and Trademark Office*